United States Patent
Akita et al.

(10) Patent No.: US 9,232,561 B2
(45) Date of Patent: Jan. 5, 2016

(54) WIRELESS COMMUNICATION DEVICE AND WIRELESS COMMUNICATION METHOD

(71) Applicants: Koji Akita, Yokohama (JP); Takayoshi Ito, Yokohama (JP); Seiichiro Horikawa, Yokohama (JP); Hideo Kasami, Yokohama (JP)

(72) Inventors: Koji Akita, Yokohama (JP); Takayoshi Ito, Yokohama (JP); Seiichiro Horikawa, Yokohama (JP); Hideo Kasami, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 201 days.

(21) Appl. No.: 13/683,336

(22) Filed: Nov. 21, 2012

(65) Prior Publication Data

US 2013/0203360 A1 Aug. 8, 2013

(30) Foreign Application Priority Data

Feb. 3, 2012 (JP) .................................. 2012-22212

(51) Int. Cl.
*H04B 7/00* (2006.01)
*H04W 88/06* (2009.01)
*H04W 8/22* (2009.01)

(52) U.S. Cl.
CPC ................ *H04W 88/06* (2013.01); *H04W 8/22* (2013.01)

(58) Field of Classification Search
CPC .... H04W 84/18; H04W 8/005; H04M 1/7253
USPC .................... 455/41.2, 552.1, 67.11, 455, 73; 370/338
See application file for complete search history.

(56) References Cited

U.S. PATENT DOCUMENTS

| | | | |
|---|---|---|---|
| 7,027,808 B2 * | 4/2006 | Wesby | 455/419 |
| 7,558,564 B2 * | 7/2009 | Wesby | 455/419 |
| 7,733,831 B2 * | 6/2010 | Samuel et al. | 370/335 |
| 8,682,246 B2 * | 3/2014 | Desai et al. | 455/41.2 |
| 2005/0271032 A1 * | 12/2005 | Yun et al. | 370/349 |
| 2009/0055478 A1 | 2/2009 | Hara | |
| 2010/0268971 A1 * | 10/2010 | Poo et al. | 713/320 |

FOREIGN PATENT DOCUMENTS

| | | | |
|---|---|---|---|
| JP | 2006094310 A | 4/2006 |
| JP | 2009055075 A | 3/2009 |
| JP | 4691592 B2 | 5/2009 |
| JP | 4406346 B2 | 11/2009 |
| JP | 2011061694 A | 3/2011 |
| JP | 2011097516 A | 5/2011 |

OTHER PUBLICATIONS

Japanese Office Action dated Jun. 3, 2014 in counterpart Japanese Application No. 2012-022212.

(Continued)

*Primary Examiner* — Sonny Trinh
(74) *Attorney, Agent, or Firm* — Holtz, Holtz, Goodman & Chick PC

(57) ABSTRACT

A wireless communication device has a plurality of wireless units each configured to cover a different wireless communication range and be capable of receiving data in the corresponding wireless communication range, a status information generator provided corresponding to the wireless unit utilized to receive data among the plurality of wireless units, in order to generate status information concerning the wireless communication range of the wireless unit utilized to receive the data, and a storage configured to store the status information in association with the data.

19 Claims, 6 Drawing Sheets

(56) References Cited

OTHER PUBLICATIONS

Kunitomo, "First Step, Basis of It", Kindaikagaku Co., First Edition, pp. 93-95, Aug. 31, 2011.

Japanese Office Action dated Jan. 30, 2015, issued in counterpart Japanese Application No. 2012-022212.

Japanese Office Action (and English translation thereof) dated Sep. 15, 2015, issued in counterpart Japanese Application No. 2012-022212.

\* cited by examiner

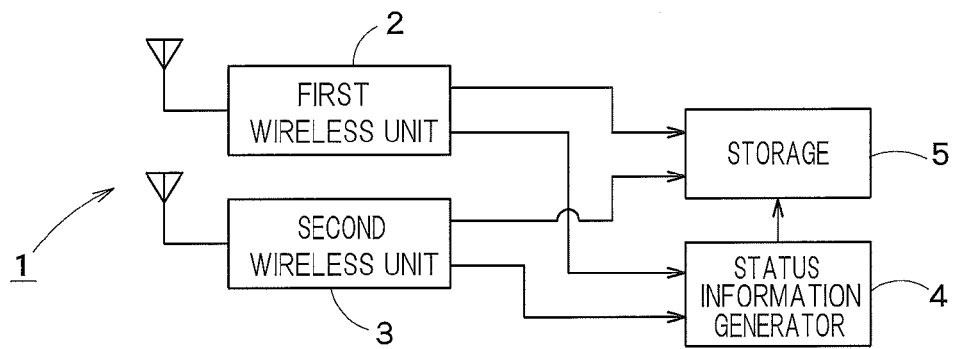
F I G. 1
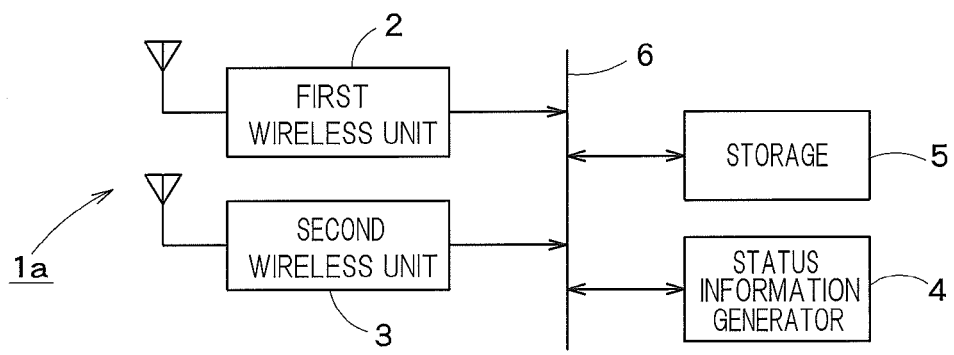
F I G. 2
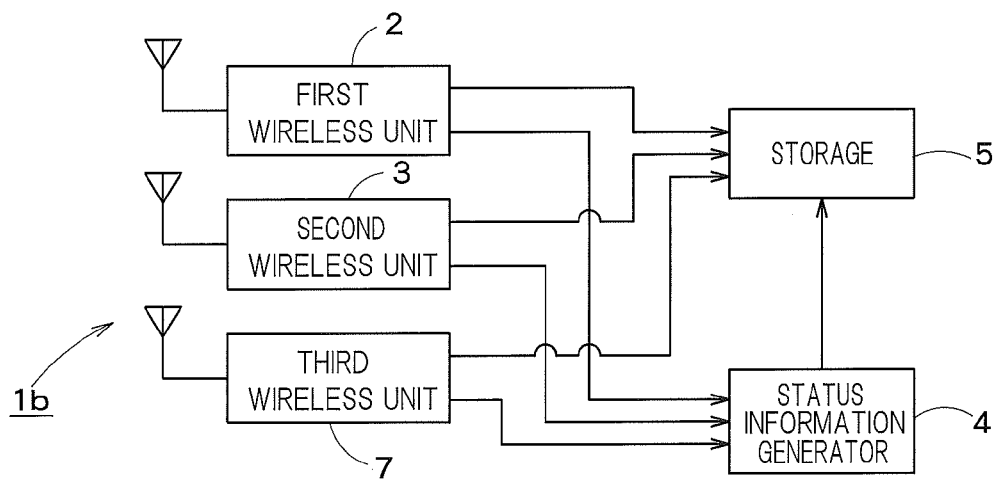
F I G. 3

| STATUS INFORMATION A | DATA A |
| STATUS INFORMATION B | DATA B |
| STATUS INFORMATION C | DATA C |
| STATUS INFORMATION D | DATA D |
| STATUS INFORMATION E | DATA E |
| STATUS INFORMATION F | DATA F |

| FIRST WIRELESS UNIT | DATA A |
| SECOND WIRELESS UNIT | DATA B |
| FIRST WIRELESS UNIT | DATA C |
| SECOND WIRELESS UNIT | DATA D |
| SECOND WIRELESS UNIT | DATA E |
| FIRST WIRELESS UNIT | DATA F |

| FIRST WIRELESS UNIT | DATA A |
| --- | --- |
| FIRST & SECOND WIRELESS UNIT | DATA B |
| FIRST WIRELESS UNIT | DATA C |
| SECOND WIRELESS UNIT | DATA D |
| SECOND WIRELESS UNIT | DATA E |
| FIRST WIRELESS UNIT | DATA F |

FIG. 7

| FIRST WIRELESS UNIT | DATA A |
| --- | --- |
| FIRST WIRELESS UNIT | DATA B |
| FIRST WIRELESS UNIT | DATA C |
| SECOND WIRELESS UNIT | DATA D |
| SECOND WIRELESS UNIT | DATA E |
| FIRST WIRELESS UNIT | DATA F |

FIG. 8

| 10 | DATA A |
| --- | --- |
| 2 | DATA B |
| 10 | DATA C |
| 2 | DATA D |
| 2 | DATA E |
| 10 | DATA F |

FIG. 9

| 10 | DATA A |
|---|---|
| 2 | DATA B |
| 20 | DATA C |
| 2 | DATA D |
| 2 | DATA E |
| 12 | DATA F |

F I G. 10

| 10 | DATA A |
|---|---|
| 2 | DATA B |
| 20 | DATA C |
| 2 | DATA D |
| 2 | DATA E |
| 10 | DATA F |

F I G. 11

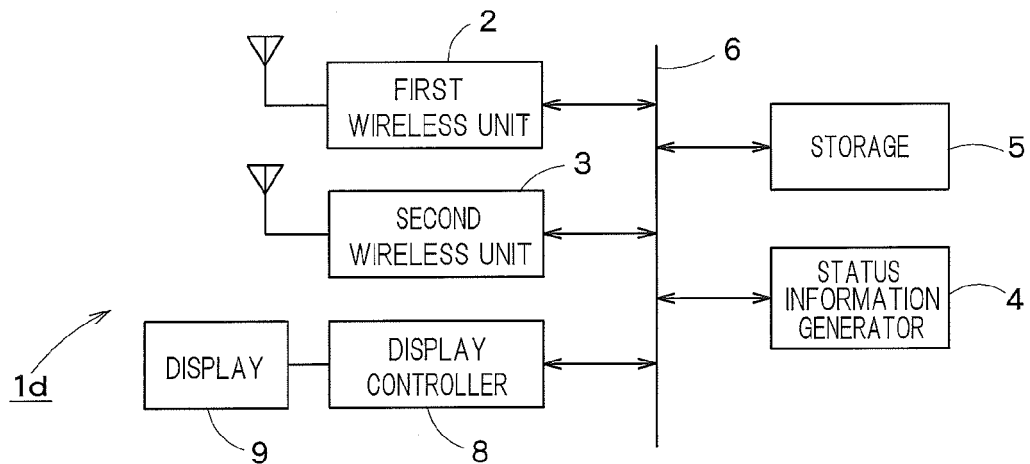
F I G. 12
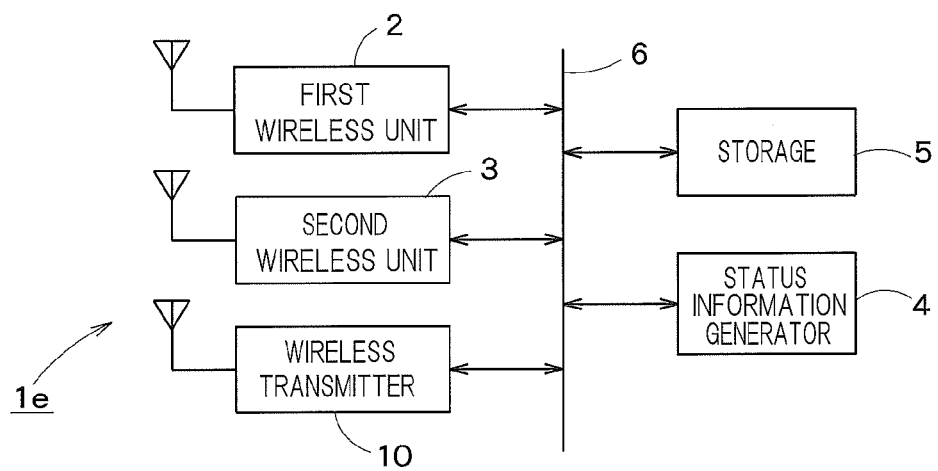
F I G. 13
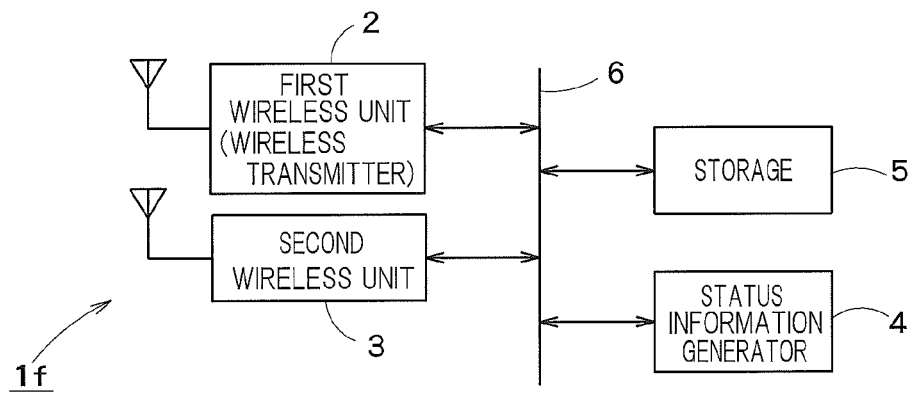
F I G. 14

| DISTRIBUTION REQUIREMENT INFORMATION A | STATUS INFORMATION A | DATA A |
|---|---|---|
| DISTRIBUTION REQUIREMENT INFORMATION B | STATUS INFORMATION B | DATA B |
| | STATUS INFORMATION C | DATA C |
| DISTRIBUTION REQUIREMENT INFORMATION D | STATUS INFORMATION D | DATA D |
| | STATUS INFORMATION E | DATA E |
| DISTRIBUTION REQUIREMENT INFORMATION F | STATUS INFORMATION F | DATA F |
F I G. 15
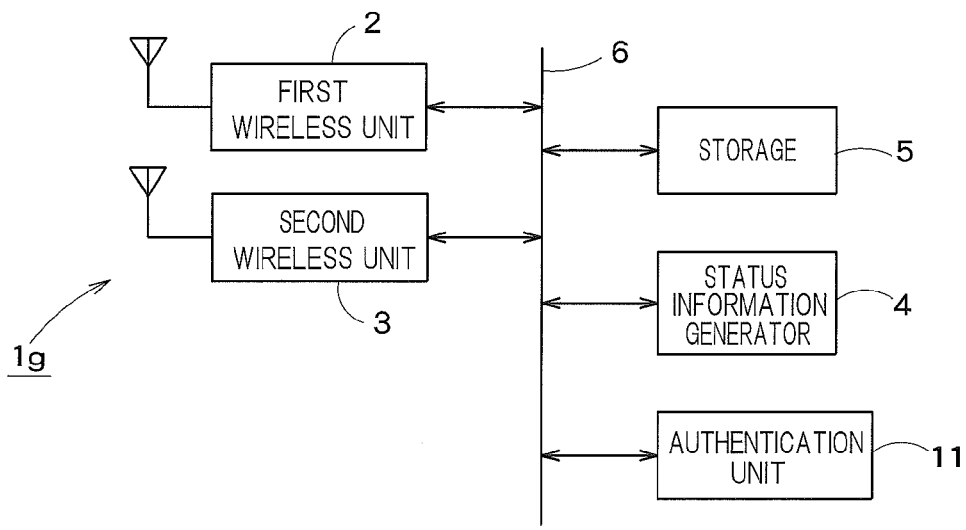
F I G. 16

WIRELESS COMMUNICATION DEVICE AND WIRELESS COMMUNICATION METHOD

CROSS REFERENCE TO RELATED APPLICATIONS

This application is based upon and claims the benefit of priority from the prior Japanese Patent Application No. 2012-22212, filed on Feb. 3, 2012, the entire contents of which are incorporated herein by reference.

FIELD

Embodiments of the present invention relate to a wireless communication device and a wireless communication method for performing wireless communication by a plurality of wireless units.

BACKGROUND

A mobile communication system has been proposed in which when another device enters a communication area of a certain device, the certain device automatically performs wireless communication. In such a communication system, data can be shared among a plurality of devices without a user's special operation. Further, since the number of devices sharing the data gradually increases as time passes, the data can be distributed without providing a server etc.

The conventional system is convenient and can reduce the user's burden in that data is automatically transmitted and received regardless of the intention of the user, but has problems that data is automatically distributed to unacquainted people and that the user is forced to receive unnecessary data. That is, in the conventional system, data is automatically transmitted and received regardless of the intention of the user, and the received data cannot be easily managed since it is difficult to check the intention of the user with respect to each of the transmitted and receive data.

Further, most of recent mobile wireless devices such as smartphone, game machine, cellular phone, mobile PC, etc. support a plurality of wireless methods. Typical wireless methods are, e.g., cellular, wireless LAN, Bluetooth (registered trademark), and Near Field Communication (NFC).

However, it is not easy to identify that data received by this type of mobile wireless device used which of wireless systems, and it is difficult to accurately grasp the intention of the user when receiving the data.

BRIEF DESCRIPTION OF THE DRAWINGS

FIG. 1 is a block diagram showing a schematic structure of a wireless communication device 1 according to a first embodiment.

FIG. 2 is a block diagram showing a schematic structure of a wireless communication device 1a according to a first modification example of FIG. 1.

FIG. 3 is a block diagram showing a schematic structure of a wireless communication device 1b according to a second modification example of FIG. 1.

FIG. 7 is a diagram showing the structure of data stored in the storage 5, in which the status information is more concrete than FIG. 5.

FIG. 8 is a diagram showing the structure of data stored in the storage 5, in which the status information is more concrete than FIG. 5.

FIG. 9 is a diagram showing the structure of data stored in the storage 5 when using weighted values as the status information.

FIG. 10 is a diagram showing a modification example of FIG. 9.

FIG. 11 is a diagram showing a modification example of FIG. 9.

FIG. 12 is a block diagram showing a schematic structure of a wireless communication device 1d according to a second embodiment.

FIG. 13 is a block diagram showing a schematic structure of a wireless communication device 1e according to a third embodiment.

FIG. 14 is a block diagram showing a schematic structure of a wireless communication device 1f according to a modification example of FIG. 13.

FIG. 15 is a diagram showing the structure of data stored in the storage 5 when additionally storing distribution requirement information.

FIG. 16 is a block diagram showing a schematic structure of a wireless communication device 1g having an authentication unit.

DETAILED DESCRIPTION

Figures 4, 5, 6:
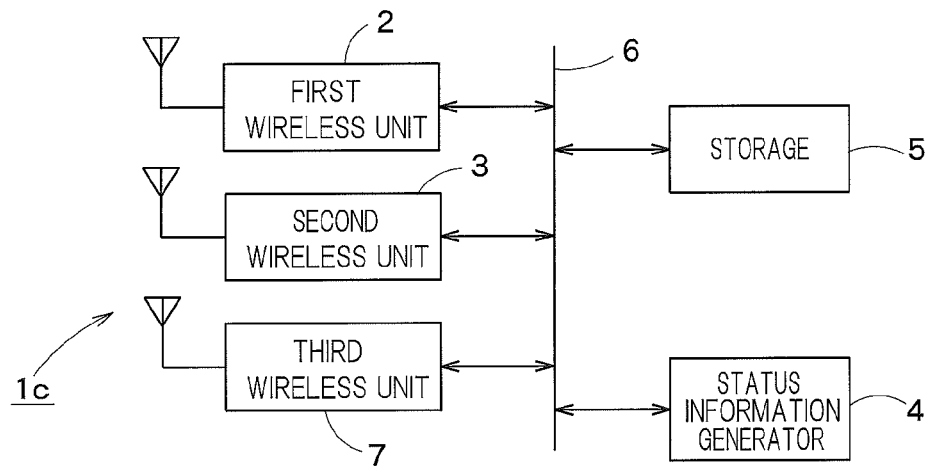
FIG. 4 is a block diagram showing a schematic structure of a wireless communication device 1c according to a first modification example of FIG. 3.
FIG. 5 is a diagram showing the structure of data stored in a storage 5.
FIG. 6 is a diagram showing the structure of data stored in the storage 5, in which status information is more concrete than FIG. 5.

According to one embodiment, a wireless communication device has a plurality of wireless units each configured to cover a different wireless communication range and be capable of receiving data in the corresponding wireless communication range, a status information generator provided corresponding to the wireless unit utilized to receive data among the plurality of wireless units, in order to generate status information concerning the wireless communication range of the wireless unit utilized to receive the data, and a storage configured to store the status information in association with the data.

Embodiments will now be explained with reference to the accompanying drawings.

First Embodiment

FIG. 1 is a block diagram showing a schematic structure of a wireless communication device 1 according to a first embodiment. The wireless communication device 1 of FIG. 1 is a mobile wireless device such as cellular phone, smartphone, game machine, mobile PC, etc.

The wireless communication device 1 of FIG. 1 has a first wireless unit 2, a second wireless unit 3, a status information generator 4, and a storage 5. The second wireless unit 3 covers a broader wireless communication range than the first wireless unit 2. For example, the first wireless unit 2 performs wireless communication based on NFC, while the second wireless unit 3 performs wireless communication using a public network based on, e.g., a cellular communication system. The first wireless unit 2 and the second wireless unit 3 can receive the same data. Further, each of the first wireless unit 2 and the second wireless unit 3 can automatically receive the data transmitted from another wireless device located in its wireless communication range.

The status information generator 4 generates first status information when certain data is received by the first wireless unit 2, and generates second status information when the same data is received by the second wireless unit 3.

The storage 5 stores the data received by the first wireless unit 2 in association with the first status information, and stores the same data received by the second wireless unit 3 in association with the second status information.

The first and second status information is used to judge the intention of a user when receiving data. That is, the first and second status information represents information about the wireless communication range of a wireless unit utilized to receive data. Here, the term "user" means the owner of the wireless communication device 1 of FIG. 1, or the owner of a communication partner device which transmits data to the wireless communication device 1. In the example given below, the owner of the wireless communication device 1 is referred as a user, for simple explanation.

The first wireless unit 2 has a wireless communication range narrower than the second wireless unit 3. Therefore, there is a high possibility that the first wireless unit 2 receives data from a communication partner located close to the wireless communication device 1 of FIG. 1. In this case, there is a relatively strong possibility that one of the user of the wireless communication device 1 and the communication partner transmitting the data to the wireless communication device 1 approaches the other with some intention. Therefore, the first status information generated when data is received by the first wireless unit 2 is information indicating that there is a high possibility that the data has been received with some intention.

On the other hand, when data is received by the second wireless unit 3, there is a high possibility that the received data has been transmitted from an unacquainted communication partner located far away. Therefore, the second status information generated when data is received by the second wireless unit 3 shows that there is less possibility that the data has been received with some intention but a high possibility that the data is received incidentally.

As stated above, by generating the first and second status information, it is possible to estimate the intention of the user when data is received by the wireless communication device 1 of FIG. 1.

In order to make it clearer that the user has some intention when data is received by the wireless communication device 1 of FIG. 1, it is desirable that the wireless communication range of the first wireless unit 2 is set narrower. As the wireless communication range becomes narrower, the distance between the wireless communication device 1 of FIG. 1 and the communication partner becomes shorter, which shows extremely strong possibility that the user and the communication partner approach each other with some intention.

For example, when the wireless communication range of the first wireless unit 2 is about several to several tens of centimeters such as NFC or TransferJet, no data can be transmitted and received until the wireless communication device 1 of FIG. 1 held by the user and the wireless device held by the communication partner approach each other, which makes it possible to suppose that the user and the communication partner have intention to exchange data.

On the other hand, it is desirable that the wireless communication range of the second wireless unit 3 is set sufficiently broader than the wireless communication range of the first wireless unit 2, so that the second wireless unit 3 is clearly distinct from the first wireless unit 2. For example, when the wireless communication range of the second wireless unit 3 is several to several tens of meters or more, data can be automatically transmitted and received between the user of the wireless communication device 1 of FIG. 1 and the communication partner even if one does not approach the other intentionally. Therefore, it is impossible to consider that there has been any intention that data should be willingly received.

FIG. 2 is a block diagram showing a schematic structure of a wireless communication device 1a according to a first modification example of FIG. 1

The wireless communication device 1a of FIG. 2 has an internal bus 6 connected to the first wireless unit 2, the second wireless unit 3, the status information generator 4, and the storage 5. The first wireless unit 2, the second wireless unit 3, the status information generator 4, and the storage 5 transmit and receive various data and information through the internal bus 6. This makes it possible to synchronize the operations of the components in the wireless communication device 1a.

Each of the wireless communication devices 1 and 1a of FIGS. 1 and 2 has two wireless units (the first wireless unit 2 and the second wireless unit 3) covering different wireless communication ranges, but the number of wireless units is not particularly questioned as long as it is two or more.

FIG. 3 is a block diagram showing a schematic structure of a wireless communication device 1b according to a second modification example of FIG. 1.

Further, FIG. 4 is a block diagram showing a schematic structure of a wireless communication device 1c according to a first modification example of FIG. 3. Similarly to FIG. 2, the components in the wireless communication device 1b are connected to the internal bus 6.

Each of the wireless communication devices 1b and 1c of FIGS. 3 and 4 has a third wireless unit 7 in addition to the components of FIGS. 1 and 2. The first wireless unit 2, the second wireless unit 3, and the third wireless unit 7 cover different wireless communication ranges. For example, it is assumed that the first wireless unit 2 covers the narrowest wireless communication range, the second wireless unit 3 covers the second narrowest wireless communication range, and the third wireless unit 7 covers the broadest wireless communication range. As a more concrete example, it is assumed that the wireless communication range of the first wireless unit 2 is set to several to several tens of centimeters, the wireless communication range of the second wireless unit 3 is set to several to several tens of meters, and the wireless communication range of the third wireless unit 7 is set to hundreds of meters to several kilometers, and status information is separately generated for the respective wireless units. Since the wireless communication ranges of the wireless units are greatly different from one another, if the wireless unit used to receive data can be identified by the status information, it is possible to correctly grasp that the data has been received with what kind of intention by referring to the status information.

Next, the status information generated by the status information generator 4 shown in FIGS. 1 to 4 will be explained in detail. As stated above, the status information is information used to judge the intention of the user when receiving data. The status information is stored in the storage 5 in association with the received data.

Each of FIGS. 5 to 11 is a diagram showing the structure of data stored in the storage 5. In the example of FIG. 5, status information A to F are generated by the status information generator 4 corresponding to six types of received data A to F, and the status information A to F and the received data A to F are stored in the storage 5 in association with each other.

The status information A to F is generated when their corresponding data A to F are received. In other words, the status information A to F is generated corresponding to the wireless units receiving the data A to F. For example, as shown in FIG. 1 or 2, when the first wireless unit 2 and the second wireless unit 3 covering different wireless communication ranges are provided, the status information A to F differ depending on which one of the first wireless unit 2 and the second wireless unit 3 receives the data A to F. When status information corresponding to the data received by the first wireless unit 2 is referred to as the first status information, and status information corresponding to the data received by the second wireless unit 3 is referred to as the second status information, the first status information and the second status information are different from each other in information showing that the data has been received by what kind of intention.

FIG. 6 shows an example in which the status information is more concrete than FIG. 5. The status information of FIG. 6 includes information for identifying the type of wireless unit used to receive data. In the example of FIG. 6, the names of the wireless units are directly shown, but information for uniquely identifying each wireless unit (e.g., MAC address, device ID, etc.) may be used instead.

As shown in FIG. 6, if information for identifying the wireless unit used to receive data is used as the status information, it is possible to easily identify which wireless unit receives the data, and to estimate the intention when receiving the data based on the information of the identified wireless unit.

Depending on the situation, there is a case where one type of data is cooperatively received by a plurality of wireless units, or where the same data has been received by one wireless unit and will be received by another wireless unit. In such cases, the status information may include information of a plurality of wireless units which have received or will receive the same data. The structure of data stored in the storage 5 in this case is as shown in FIG. 7, for example. In FIG. 7, the status information showing "First & Second wireless units" is generated by synthesizing the status information when the data B is received by the first wireless unit 2 and the status information when the data B is received by the second wireless unit 3.

Instead, as shown in FIG. 8, when the same data has been received or will be received by a plurality of wireless units (e.g., the first wireless unit 2 and the second wireless unit 3), the status information corresponding to a wireless unit (e.g., the first status information) covering the narrowest wireless communication range in the wireless units may be used as the final status information.

When the same data as the received data already stored in the storage 5 is received by another wireless unit, since their status information are different, the data and the status information related to each other can be stored in the storage 5 on each occasion. Instead, the data and the status information already stored in the storage 5 may be eliminated so that only the same data newly received and the status information related to each other are stored in the storage 5. In this case, the latest status information is constantly stored in the storage 5, which means that the status information is continuously updated.

For example, it is assumed that data is received by the second wireless unit 3 covering a broader wireless communication range, and then the user of the wireless communication device 1 intentionally approaches the communication partner to receive the same data again by the first wireless unit 2. In this case, by using newly generated status information, it is possible to more correctly estimate that the user has an intention to receive the data.

When receiving the same data as the data already received, reception of the data may be stopped at a time point recognized to be the same data, and a process required after receiving data may be started. For example, when it is found that the same data has already been stored in the storage 5 before reception of data is begun, the process required after receiving data may be started without receiving the data.

To the contrary, the data and the status information already stored in the storage 5 may be kept while eliminating the same data newly received and its status information. That is, the data received first and its status information may be continuously retained. In this case, since the status information is not updated, it is possible to prevent the status information from being rewritten afterwards.

In FIGS. 6 to 8, information capable of identifying a wireless unit is used as the status information, but the status information may be a weighted value which is weighted corresponding to the type of wireless unit utilized to receive data. FIG. 9 is a diagram showing an example when using weighted values as the status information. In the example of FIG. 1, since the wireless communication range of the first wireless unit 2 is narrower than the wireless communication range of the second wireless unit 3, there is a high possibility that the user or the communication partner has greater intention to transmit and receive data when the data is received by the first wireless unit 2 compared to the case where the data is received by the second wireless unit 3. Accordingly, the weighted value as the status information corresponding to the data received by the first wireless unit 2 is set larger than the weighted value as the status information corresponding to the data received by the second wireless unit 3. In the example of FIG. 9, the weighted value as the status information corresponding to the data received by the first wireless unit 2 is set to 10, while the weighted value as the status information corresponding to the data received by the second wireless unit 3 is set to 2.

According to FIG. 9, the intention of the user when receiving data can be estimated by the level of the weighted value for the status information. For example, when a larger weighted value is set for a wireless unit covering a narrower wireless communication range, it is possible to intuitively know that the larger weighted value shows that the data is received with strong intention. To the contrary, a smaller weighted value may be set for a wireless unit covering a narrower wireless communication range. Also in this case, it is possible to intuitively know that the smaller weighted value shows that the data is received with strong intention.

FIG. 10 is a diagram showing an example where a plurality of weighted values are synthesized to set the final weighted value. As explained in FIG. 7, when the same data has been received or will be received by a plurality of wireless units, the status information may be synthesized. When weighted values are used as the status information, the final weighted value may be obtained by simply summing up the weighted values corresponding to a plurality of wireless units which have received or will receive the same data.

For example, in FIG. 10, the weighted value corresponding to data F is 12 (=10+2) since the first wireless unit 2 having a weighted value of 10 and the second wireless unit 3 having a weighted value of 2 have received or will receive the same data.

In the example of FIG. 10, when the second wireless unit 3 tries to receive the data F totally six times, the final weighted value also becomes 12. It is not necessarily easy to determine that the user has a stronger intention to receive the data F in either of when the first wireless unit 2 and the second wireless unit 3 try to receive the data F once respectively, or when only the second wireless unit 3 tries to receive the data F six times.

Accordingly, as shown in FIG. 11, when a plurality of wireless units having different weighted values try to receive the same data, it is also possible to select a wireless unit corresponding to the largest weighted value from the wireless units trying to receive the same data, in order to use the weighted value of the selected wireless unit as the final weighted value, instead of summing up the weighted values. For example, when the first wireless unit 2 and the second wireless unit 3 try to receive the data F of FIG. 11, a weighted value of 10 corresponding to the first wireless unit 2 becomes the final weighted value.

As stated above, in the first embodiment, when data is received by any one of a plurality of wireless units covering different wireless communication ranges, the status information for judging the intention when receiving the data is stored in the storage 5 in association with the received data. The status information makes it possible to grasp that the data has been received with what kind of intention, and to recognize the importance of the received data.

Second Embodiment

A second embodiment is characterized in that the data stored in the storage 5 is displayed based on the status information.

FIG. 12 is a block diagram showing a schematic structure of a wireless communication device 1*d* according to the second embodiment.

The wireless communication device 1*d* of FIG. 12 may be a mobile wireless device such as a cellular phone, or may be a stationary wireless device such as a base station and a digital signage.

In addition to the components in the wireless communication device 1 of FIG. 1, the wireless communication device 1*d* of FIG. 12 has a display 8 and a display controller 9. The display controller 9 grasps the intention of the user when receiving data, based on the corresponding status information stored in the storage 5, and selects at least partial data from the storage 5 in accordance with this intention to display it on the display 8.

For example, when data received with the user's strong intention is found from the status information, the display controller 9 displays the data by priority. Accordingly, the data which is regarded as important by the user is displayed by priority, which improves convenience for the user.

Note that the user should not be limited to the owner of the wireless communication device 1*d*, and may be the administrator or installer of the wireless communication device 1*d*. Further, when the wireless communication device 1*d* is a digital signage, the user may be an agency relating to its installment.

As stated above, in the second embodiment, since data stored in the storage 5 is selected based on the status information stored in the storage 5, and displayed on the display 8, the data can be displayed in a manner considering the intention of the user when receiving the data. Accordingly, the user can easily find the data attractive to the user on the display 8, which improves convenience for the user.

Third Embodiment

A third embodiment is characterized in that the data stored in the storage 5 is transmitted based on the status information.

FIG. 13 is a block diagram showing a schematic structure of a wireless communication device 1*e* according to the third embodiment.

The wireless communication device 1*e* of FIG. 13 also may be a mobile wireless device such as a cellular phone, or may be a digital signage installed in the city streets etc.

The wireless communication device 1*e* of FIG. 13 has a wireless transmitter 10 instead of the display 8 and the display controller 9 in FIG. 12. When it is identified by the status information to be data that the user received with the strong intention, the wireless transmitter 10 transmits the data by priority. Therefore, the data attractive to the user is transmitted by priority, and the receiver of the transmitted data can receive data of high importance by priority, which improves convenience.

Since the data attractive to the user of the wireless communication device 1*e* of FIG. 13 can be transmitted to a specific person approaching the user, the same data can be easily shared among people having the same liking, with simple steps.

In FIG. 13, the wireless transmitter 10 is arranged separately from the first wireless unit 2 and the second wireless unit 3, but data may be transmitted using the first wireless unit 2 or the second wireless unit 3. The block configuration in this case is as shown in FIG. 14, in which a wireless communication device 1*f* does not have the wireless transmitter 10.

Another Embodiment

In the examples explained in the first to third embodiments, the received data and the status information are stored in the storage 5 in association with each other, but distribution requirement information of the data may be additionally stored.

FIG. 15 is a diagram showing the structure of data stored in the storage 5 when additionally storing the distribution requirement information. There is no need to add the distribution requirement information for all types of data. Accordingly, in the example of FIG. 15, distribution requirement information for data C and E are omitted.

The distribution requirement information can specify the conditions when transmitting the received data stored in the storage 5. This eliminates a fear of transmitting data to an unexpected communication partner.

Here, the distribution requirement information may be determined for each wireless unit. For example, only the first wireless unit 2 covering a narrower wireless communication range may be allowed to transmit (distribute) data. Since the first wireless unit 2 can transmit data only when its communication partner is located close, there is less possibility that the data is transmitted to an unexpected communication partner through the first wireless unit 2.

Further, the distribution requirement information may specify performing an authentication process before transmitting data. The block configuration in this case is as shown in a wireless communication device 1*g* of FIG. 16.

The wireless communication device 1*g* of FIG. 16 has an authentication unit 11. When the distribution requirement information specifies performing the authentication process, the authentication unit 11 performs the authentication process with a communication partner, and only when the authentication has been successfully completed, corresponding data is transmitted using, e.g., the first wireless unit 2.

Each of the wireless communication devices 1 to 1*g* according to the above embodiments may be any one of a mobile wireless device such as cellular phone, smartphone, game machine, laptop PC, etc.; a stationary wireless device such as base station, access point, etc.; and an information transmitter such as kiosk terminal, digital signage, etc.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A wireless communication device comprising:
   a plurality of wireless modules each covering a different wireless communication range;
   a status information generator to generate status information which specifies the wireless module utilized to receive data, from among the plurality of wireless modules; and
   a storage to store the status information in association with the received data,
   wherein the status information includes information for uniquely identifying the wireless module utilized to receive the data.

2. The device of claim 1, wherein the status information is a weighted value which is weighted corresponding to the wireless module utilized to receive the data.

3. The device of claim 2, wherein the weighted value is largest for the wireless module which covers a narrowest wireless communication range among the plurality of wireless modules.

4. The device of claim 2, wherein when two or more wireless modules among the plurality of wireless modules have received or try to receive identical data, the status information generator generates the status information by synthesizing the weighted values corresponding to the two or more wireless modules.

5. The device of claim 2, wherein when two or more wireless modules among the plurality of wireless modules have received or try to receive identical data, the status information generator generates the status information based on the weighted value corresponding to the wireless module which covers a narrowest wireless communication range among the two or more wireless modules.

6. The device of claim 1, further comprising:
   a display controller which performs control for selecting at least partial data from the storage based on the status information stored in the storage, in order to display the selected data on a display.

7. The device of claim 6, wherein the display controller sets priorities on the data stored in the storage based on the status information stored in the storage, and displays data on the display in accordance with the priorities.

8. The device of claim 1, further comprising:
   a wireless transmitter to select at least partial data from the storage based on the status information stored in the storage, in order to transmit the selected data to a predetermined communication partner.

9. The device of claim 8, wherein the wireless transmitter sets priorities on the data stored in the storage based on the status information stored in the storage, and transmits data to the communication partner in accordance with the priorities.

10. The device of claim 8, wherein the wireless transmitter is one of the plurality of wireless modules.

11. The device of claim 1,
    wherein at least one of the plurality of wireless modules receives data together with distribution requirement information of the data, and
    when receiving the distribution requirement information, the storage stores the data, the status information corresponding to the data, and the distribution requirement information corresponding to the data in association with one another.

12. The device of claim 11, further comprising:
    an authenticator to perform a predetermined authentication process with a communication partner for transmitting the data stored in the storage,
    wherein the distribution requirement information is capable of including information instructing the communication partner for transmitting the data so as to preliminarily perform the authentication process to each other, and
    when the distribution requirement information includes the information concerning the authentication process, the authenticator performs the authentication process with the communication partner, and allows that the data is transmitted to the communication partner only when the authentication is successfully completed.

13. The device of claim 1, further comprising at least one antenna.

14. A wireless communication method, comprising:
    generating status information which specifies a wireless module utilized to receive data, from among a plurality of wireless modules each covering a different wireless communication range; and
    storing the status information in association with the received data,
    wherein the status information includes information for uniquely identifying the wireless module utilized to receive the data.

15. The method of claim 14, wherein the status information is a weighted value which is weighted corresponding to the wireless module utilized to receive the data.

16. The method of claim 15, wherein the weighted value is largest for the wireless module which covers a narrowest wireless communication range among the plurality of wireless modules.

17. The method of claim 15, wherein when two or more wireless modules among the plurality of wireless modules have received or try to receive identical data, the status information is generated by synthesizing the weighted values corresponding to the two or more wireless modules.

18. The method of claim 15, wherein when two or more wireless modules among the plurality of wireless modules have received or try to receive identical data, the status information is generated based on the weighted value corresponding to the wireless module which covers a narrowest wireless communication range among the two or more wireless modules.

19. The method of claim 14, further comprising:
    performing control for selecting at least partial data from the storage based on the status information stored in the storage, in order to display the selected data on a display.

* * * * *